(12) United States Patent
Becvar et al.

(10) Patent No.: US 10,798,722 B2
(45) Date of Patent: Oct. 6, 2020

(54) METHODS AND DEVICES FOR RESOURCE SCHEDULING IN WIRELESS COMMUNICATION SYSTEMS

(71) Applicants: HON HAI PRECISION INDUSTRY CO., LTD., New Taipei (TW); Czech Technical University in Prague, Prague (CZ)

(72) Inventors: Zdenek Becvar, Prague (CZ); Pavel Mach, Prague (CZ)

(73) Assignees: HON HAI PRECISION INDUSTRY CO., LTD., New Taipei (TW); Czech Technical University in Prague, Prague (CZ)

( * ) Notice: Subject to any disclaimer, the term of this patent is extended or adjusted under 35 U.S.C. 154(b) by 0 days.

(21) Appl. No.: 16/228,829

(22) Filed: Dec. 21, 2018

(65) Prior Publication Data

US 2019/0200373 A1 Jun. 27, 2019

Related U.S. Application Data

(60) Provisional application No. 62/609,476, filed on Dec. 22, 2017.

(51) Int. Cl.
*H04L 5/00* (2006.01)
*H04B 7/022* (2017.01)
(Continued)

(52) U.S. Cl.
CPC ............ *H04W 72/12* (2013.01); *H04B 7/022* (2013.01); *H04B 17/27* (2015.01); *H04B 17/382* (2015.01); *H04L 5/0069* (2013.01); *H04L 5/0087* (2013.01); *H04L 5/0096* (2013.01); *H04W 24/02* (2013.01); *H04W 28/0226* (2013.01); *H04W 28/0247* (2013.01); *H04W 28/08* (2013.01); *H04W 28/16* (2013.01); *H04W 72/048* (2013.01); *H04W 72/0486* (2013.01); *H04W 72/085* (2013.01); *H04W 72/1231* (2013.01); *H04W 72/1252* (2013.01);

(Continued)

(58) Field of Classification Search
CPC .... G06N 20/00–20; H04B 7/002–0495; H04B 17/0082–3913; H04L 1/12–20; H04L 5/003–02; H04W 8/18–245; H04W 24/02–10; H04W 28/02–26; H04W 72/005–14; H04W 74/002–0891; H04W 88/02; H04W 88/04–12; H04W 92/08–12
See application file for complete search history.

(56) References Cited

U.S. PATENT DOCUMENTS

| | | | |
|---|---|---|---|
| 2012/0244871 A1* | 9/2012 | Zhao | H04W 16/10 455/452.1 |
| 2013/0231125 A1* | 9/2013 | Jeon | H04W 72/082 455/452.1 |

(Continued)

*Primary Examiner* — Timothy J Weidner
(74) *Attorney, Agent, or Firm* — ScienBiziP, P.C.

(57) ABSTRACT

A resource scheduling method includes determining, by a centralized scheduler, a classification threshold, classifying, by the centralized scheduler, each of a plurality of User Equipments (UEs) as a Cell Edge (CE) UE or a Non-Cell Edge (nCE) UE according to the classification threshold, and performing, by the centralized scheduler, a resource scheduling for the at least one CE UE and the at least one nCE UE.

23 Claims, 6 Drawing Sheets

(51) Int. Cl.

| | |
|---|---|
| *H04B 17/27* | (2015.01) |
| *H04B 17/382* | (2015.01) |
| *H04W 24/02* | (2009.01) |
| *H04W 28/02* | (2009.01) |
| *H04W 28/08* | (2009.01) |
| *H04W 28/16* | (2009.01) |
| *H04W 72/04* | (2009.01) |
| *H04W 72/08* | (2009.01) |
| *H04W 72/12* | (2009.01) |
| *H04W 88/02* | (2009.01) |
| *H04W 88/08* | (2009.01) |
| *H04W 88/12* | (2009.01) |
| *H04W 92/10* | (2009.01) |
| *H04W 92/12* | (2009.01) |

(52) U.S. Cl.
CPC .......... *H04W 88/02* (2013.01); *H04W 88/085* (2013.01); *H04W 88/12* (2013.01); *H04W 92/10* (2013.01); *H04W 92/12* (2013.01)

(56) References Cited

U.S. PATENT DOCUMENTS

2015/0351106 A1* 12/2015 Wijetunge ........ H04W 72/1226
　　　　　　　　　　　　　　　　　　　　370/329
2018/0234991 A1* 8/2018 Becvar .............. H04W 72/0486
　　　　　　　　　　　　　　　　　　　　370/329
2019/0007954 A1* 1/2019 Mach .................... H04W 72/04
　　　　　　　　　　　　　　　　　　　　370/329

* cited by examiner

METHODS AND DEVICES FOR RESOURCE SCHEDULING IN WIRELESS COMMUNICATION SYSTEMS

CROSS REFERENCE

The present application claims the benefit of and priority to a provisional U.S. Patent Application Ser. No. 62/609,476 filed Dec. 22, 2017, entitled "DYNAMIC SPLIT OF SCHEDULING FUNCTIONALITIES BETWEEN BBU AND RRH". The disclosure of the application is hereby incorporated fully by reference into the present application.

TECHNICAL FIELD

The present disclosure generally relates to methods and devices for resource scheduling in wireless communication systems.

BACKGROUND

The $3^{rd}$ Generation Partnership Project (3GPP) defines several options for splitting of control functionalities between a central unit, represented by a Base Band Unit (BBU), and a distributed unit, represented by a Remote Radio Head (RRH), in a Cloud-Radio Access Network (C-RAN). In addition, an option for a flexible functional split is outlined in the 3GPP standard as a topic for further studies. Another solution is the hierarchical scheduling, which decouples scheduling-related functions and splits these functions among a Centralized Scheduler (C-Sc) located in the BBU and a Distributed Scheduler (D-Sc) located in the RRH. The hierarchical scheduler introduces a way how to mitigate the performance impairment due to the realistic fronthaul (e.g., a non-ideal fronthaul) with limited capacity and non-zero latency. The hierarchical scheduler may handle the scheduling and allocation of resources according to the actual latency at the fronthaul, the Quality of Service (QoS) requirements of the User Equipments (UEs), the hardware implementations of the RRH(s) and BBU(s), etc. In addition, a smart allocation of resources to further enhance the scheduler performance in the scenario of the realistic fronthaul (e.g., with a non-zero latency) may be used.

However, where and how to dynamically place the scheduling functionalities among the RRH(s) and the BBU(s) to improve the system performance and/or adjust the complexity in the individual entities is still an open issue.

Thus, there is a need for methods for dynamic split of scheduling functionalities in the wireless communication systems.

SUMMARY

The present disclosure is directed to methods and devices for resource scheduling in wireless communication systems.

In an aspect of the present disclosure, a resource scheduling method is provided. The resource scheduling method includes: determining, by a centralized scheduler, a classification threshold, classifying, by the centralized scheduler, each of a plurality of User Equipments (UEs) as a Cell Edge (CE) UE or a Non-Cell Edge (nCE) UE according to the classification threshold, and performing, by the centralized scheduler, a resource scheduling for the at least one CE UE and the at least one non-cell edge UE.

In another aspect of the present disclosure, a BBU is provided. The BBU includes one or more non-transitory computer-readable media having computer-executable instructions embodied thereon and at least one processor coupled to the one or more non-transitory computer-readable media. The processor is configured to execute the computer-executable instructions to determine a classification threshold, classify each of a plurality of UEs as a CE UE or an nCE UE according to the classification threshold, and perform a resource scheduling for the at least one cell edge UE and the at least one non-cell edge UE.

DETAILED DESCRIPTION

Figure 1:
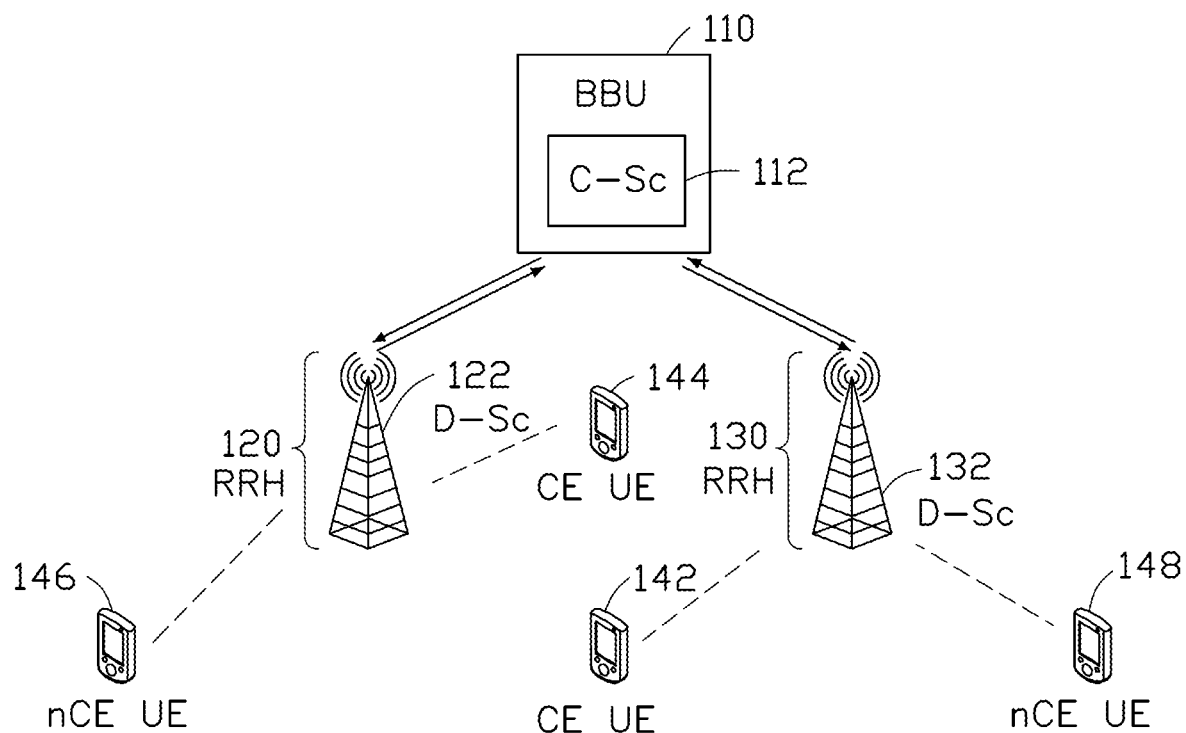
FIG. 1 is a schematic diagram illustrating a wireless communication system, according to an exemplary implementation of the present disclosure.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, and B exists alone. In addition, the character "/" herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

FIG. 1 is a schematic diagram illustrating a wireless communication system 100, according to an exemplary implementation of the present disclosure. The wireless communication system 100 includes a BBU 110, a plurality of RRHs 120 and 130, and a plurality of UEs 142, 144, 146 and 148. In the present implementation, the BBU 110 may communicate with each of the RRHs 120 and 130 through a fronthaul. The RRHs 120 and 130 may communicate with the UEs 142, 144, 146 and 148 through radio channels. In addition, in this implementation, the UEs 142 and 144 are classified as the Cell edge (CE) UEs, and the UEs 146 and 148 are classified as the Non-cell edge (nCE) UEs.

The CE UEs (e.g., the CE UEs 142 and 144) may suffer from interferences imposed by the neighboring RRHs in the downlink (DL) transmissions and from the UEs connected to the neighboring RRHs in the uplink (UL) transmissions. For example, the CE UE 142 connected to the RRH 130 may suffer from the interference caused by the RRH 120, and/or other UEs connected to (or in vicinity of) the RRHs (e.g., RRHs 120 and 130). Similarly, the CE UE 144 connected to the RRH 120 may suffer from the interference caused by the RRH 130, and/or other UEs connected to (or in vicinity of) the RRHs (e.g., the RRHs 120 and 130).

The BBU 110 includes a C-Sc 112. The RRH 120 and the RRH 130 include a D-Sc 122 and a D-Sc 132, respectively. The C-Sc 112 may cooperate with the D-Scs 122 and 132 to form a hierarchical scheduling architecture (e.g., the hierarchical scheduler). The C-Sc 112 may arrange data transmissions for the CU UEs (e.g., the CE UEs 142 and 144), and exploit the knowledge on the interference from other cells (e.g., the RRHs) and/or other UEs to schedule the transmission resources. On the other hand, the D-Scs 122 and 132 may schedule data transmissions for the respective nCE UEs (e.g., the nCE UE 146 scheduled by the D-Sc 122 and the nCE UE 148 scheduled by the D-Sc 132), which may not be influenced by the interferences from other cells, RRHs or UEs. In some implementations, the nCE UEs (e.g., the nCE UEs 146 and 148) may be influenced by the interferences from other cells, but not significantly influenced as the CE UEs (e.g., the CE UEs 142 and 144). The C-Sc 112 may also schedule the data transmissions for the nCE UEs (e.g., the nCE UEs 146 and 148).

Figure 2:
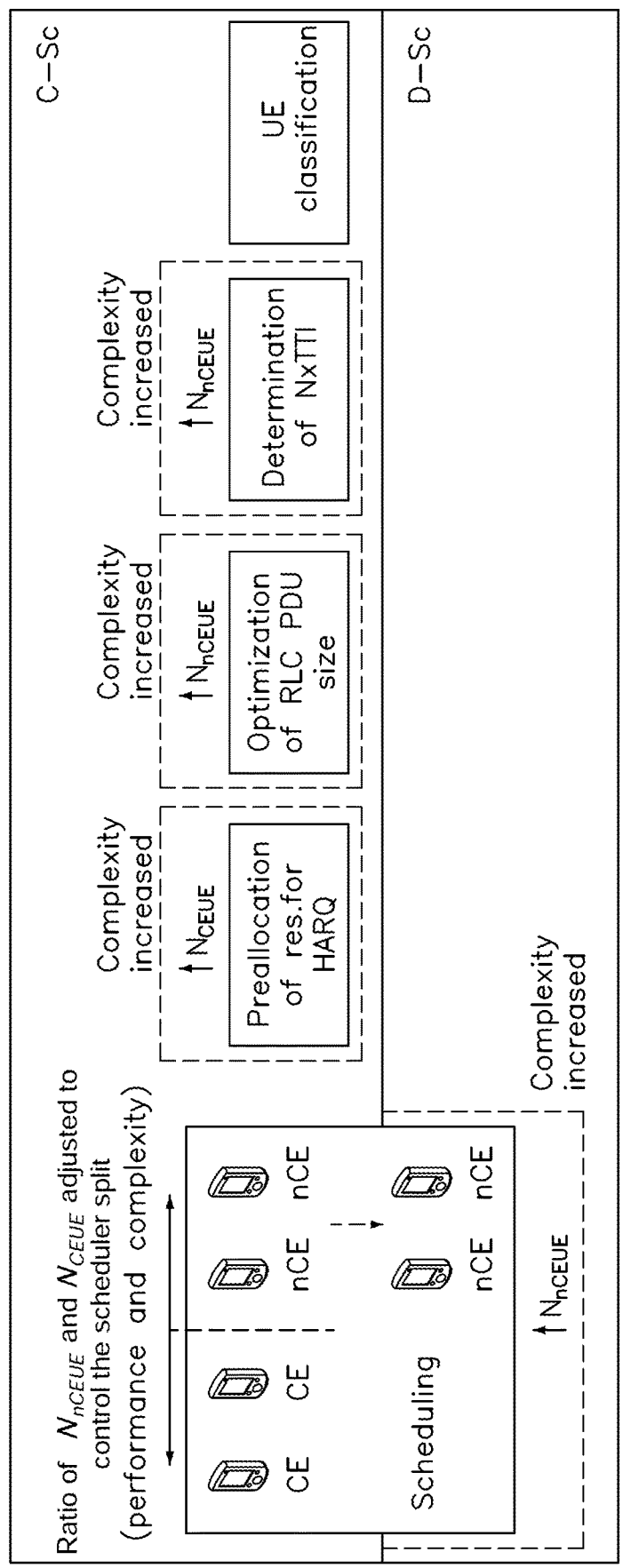
FIG. 2 is a schematic diagram illustrating the hierarchical scheduler.

FIG. 2 is a schematic diagram illustrating a hierarchical scheduler 200. An envelope of each block in the hierarchical scheduler 200 represents the corresponding computing complexity (solid lines). The dashed lines in FIG. 2 illustrate the computing complexity after the number of nCE UEs is changed. For example, the expanded block (dashed line) of the scheduling in the D-Sc represents an increase in the computing complexity after the number of nCE UEs is increased. That is, the greater the number of nCE UEs is, the higher the computing complexity of the D-Sc becomes.

As shown in FIG. 2, the hierarchical scheduler 200 can be decomposed into the following functionalities to allocate and schedule resources for the UEs: 1) scheduling of resources for both the CE UEs and the nCE UEs; 2) pre-allocation of the resources for Hybrid Automatic Repeat Request (HARQ) retransmission; 3) optimization of Radio Link Control (RLC) Protocol Data Unit (PDU) size depending on the status of the UE's radio channel and its variation; 4) determination of a centralized scheduling period (N); and 5) classification of the UEs to the CE and the nCE. Out of these functionalities, the scheduling for the nCE UEs is carried out by the D-Sc (e.g., the D-Sc 122 or 132 shown in FIG. 1) located typically in the RRH (e.g., the RRH 120 or 130 shown in FIG. 1). The remaining functionalities are performed by the C-Sc (e.g., the C-Sc 112 shown in FIG. 1) located typically in the BBU (e.g., the BBU 110 as shown in FIG. 1). All of these functionalities can also be carried out by any dedicated or general purpose hardware collocated with the BBU, the RRH, or any other entity (e.g., Mobile Edge Computing (MEC) server) in the network with the ability to perform the computation.

In various implementations of the present disclosure, the network may dynamically split the scheduling-related functionalities between the RRHs and the BBU to improve the overall system performance. For example, the dynamic split can balance the computing load efficiently and improve the QoS offered to the UEs based on the current network status. The current network status may refer to the current fronthaul quality, the radio channel quality, etc. In some implementations, the dynamic split of the scheduling-related functionalities between the C-Sc and the D-Sc may be implemented by a continual classification/re-classification of the UEs to the CE and nCE UEs. In such a case, the sum of the number ($N_{nCEUE}$) of the nCE UEs and the number ($N_{CEUE}$) of the CE UEs is equal to the total number ($N_{UE}$) of the UEs in the network, which can be expressed as $$N_{UE}=N_{nCEUE}+N_{CEUE}$$

In some implementations, the classification of the UEs may be performed both proactively on a regular or irregular basis or reactively if the performance of the network is degraded and a re-classification of the UEs results in an improved performance of the network.

In some implementations, the classification of UEs may be based on a relative or an absolute comparison of the channels (e.g., signal level, Reference Signal Received Power (RSRP), Reference Signal Received Quality (RSRQ) and Signal to Interference and Noise ratio (SINR)) from the serving and neighboring RRHs (or the general base stations).

For example, the classification to the CE and nCE UEs may be based on a comparison of the observed channel quality (e.g., $SINR_i$, RSRQ or any other metric related to channel quality) of the i-th UE with a predefined threshold. For example, if the channel quality of the i-th UE is defined in terms of $SINR_i$, then the i-th UE may be classified as:

CE UE if $SINR_i < SINR_t$; or
nCE UE if $SINR_i \geq SINR_t$.
where $SINR_t$ is the predefined threshold.

As another example, the classification of the UEs may be performed based on the exploitation of the knowledge of the RRHs (or general base stations) serving the i-th UE by means of Coordinated Multipoint (CoMP) transmissions. In such a case, the i-th UE is classified as:

CE UE if at least two RRHs are supposed to coordinate the data transmission to the i-th UE; or
nCE UE if only one RRH is indicated to transmit data to the i-th UE.

In the case of CoMP-based classification, the classification may be defined so that the UE is classified as:

CE UE if at least two RRHs fulfill $S_k > \max\{S_j\} - s_{CoMP}$; or
nCE UE if one and only one RRH fulfills $S_k > \max\{S_j\} - s_{CoMP}$, where $S_k$ is the level of Received Signal Strength (RSS) (or any other metric with similar meaning, such as RSRP) by the UE from the k-th RRH, $\max\{S_j\}$ indicates the maximum signal level observed by the UE out of all detected signals, and $s_{CoMP}$ is the threshold of the signal level for the inclusion of the RRH to the set of RRHs coordinating their transmissions to the UE.

As another example, the classification of the UEs may be performed based the CoMP gain ($G_{CoMP}$) so that the UE is classified as:

CE UE if $G_{CoMP} > \beta \times (L_{RCF} + L_{FD})$; or nCE UE if $G_{CoMP} \leq \beta \times (L_{RCF} + L_{FD})$, where $\beta$ is the coefficient expressing how many times the CoMP gain ($G_{CoMP}$) should be higher comparing to the losses due to the fronthaul delay ($L_{FD}$) and radio channel fluctuation ($L_{RCF}$).

In some implementations, the classification threshold (represented by, for example, $SINR_t$, $s_{CoMP}$, $\beta$, or any other threshold) may be set with respect to at least one of the radio channel fluctuation and the fronthaul status.

The radio channel fluctuation may be represented, for example, by a detected mobility status. In some implementations, the status of the radio channel fluctuation may be classified into at least two states: the stable channel state (represented by, for example, a low mobility and/or a high channel coherence time, etc.) and the unstable channel state (represented by, for example, a high mobility and/or a low channel coherence time, etc.). It should be noted that additional state(s) of the radio channel fluctuation can be defined for higher granularity of the classification and consequently for a potential improvement of the system performance. In some implementations, the state of radio channel fluctuation can be determined by comparing the observed radio channel information with one or more predefined thresholds. For example, the radio channel fluctuation may be indicated in the stable channel state by the C-Sc when the observed channel coherence time excesses a coherence time threshold.

The fronthaul status may be represented by, for example, the fronthaul delay, the fronthaul load, the available capacity at the fronthaul, the actual available throughput, the fronthaul jitter, etc. In some implementations, the fronthaul status may be classified into at least two states: the high quality state (represented by, for example, a low fronthaul delay, a high available capacity, a low load of the fronthaul, etc.) and the low quality state (represented by, for example, a high fronthaul delay, a low available capacity, a high fronthaul load, etc.). Additional state(s) of the fronthaul status can also be defined for higher granularity of the classification. In some implementations, the fronthaul status can be determined by comparing the observed fronthaul information with one or more predefined thresholds. For example, the fronthaul status may be indicated in the high quality state by the C-Sc when the observed fronthaul delay is lower than a fronthaul delay threshold.

In some implementations, the performance of the scheduling and/or the complexity of the D-Sc is controlled by the ratio of the CE and nCE UEs. The C-Sc may adjust the number of the CE and nCE UEs to overcome limitations imposed by the actual fronthaul status and/or the radio channel stability. This is because the nCE UEs are scheduled by the D-Sc(s) with a short scheduling period. Thus, only a low delay between the time when the channel quality is reported and the time when the data is actually transmitted is ensured if the radio channel is unstable (e.g., as indicated in the unstable channel state) and/or the fronthaul is of a low quality (e.g., as indicated in the low quality state). In contrast, for a stable radio channel (e.g., as indicated in the stable channel state) and/or a high quality fronthaul (e.g., indicated in the high quality state), the resource scheduling may be performed in the C-Sc to offload the computations from the RRHs and to maximize the common benefits of the centralized control (e.g., efficient exploitation of CoMP, energy efficiency, etc.). It should be noted that the present disclosure is not limited to the above examples. For example, in addition to the radio channel fluctuation and the fronthaul status, an impact on the overall system performance may also be considered when the classification of the UEs is performed. As another example, the classification of the UEs may be used to control the complexity of the D-Sc(s) in terms of the available computing power for processing the resource scheduling in the D-Sc(s). Specifically, the complexity of computation in the RRH(s) may be proportional to the number of the nCE UEs, which are scheduled by the D-Sc(s), so the lower the number of the nCE UEs is, the lower the computing load (complexity) is imposed on the RRH(s).

Below, exemplary cases of the dynamic split of resource scheduling and allocation in response to the classification of the UEs are provided.

Case 1: The process of radio resource scheduling and allocation is split dynamically between the D-Sc and the C-Sc according to the radio channel fluctuation and/or the fronthaul status.

In Case 1, the classification of the UEs to the CE and nCE UEs is performed by the system (e.g., the C-Sc) dynamically over time according to the following rules:

1) For low quality fronthaul, the number of the nCE UEs is high and the number of CE UEs is low in order to overcome the fronthaul delay as the nCE UEs are scheduled by the D-Sc.

2) For high quality fronthaul, the number of the nCE UEs is low and the number of the CE UE is high in order to exploit the knowledge of the wide network environment (e.g., the neighboring cells) for efficient radio resource scheduling with efficient considerations of the advanced techniques such as CoMP, and, at the same time to exploit the benefits of the C-Sc located in a central location (e.g., in the BBU).

3) For stable radio channel, the number of the nCE UEs is low and the number of the CE UEs is high as the C-Sc can be exploited for the scheduling over a longer period (e.g., several consecutive transmission time intervals) without degradation of the radio communication performance.

4) For unstable radio channel, the number of the nCE UEs is high and the number of the CE UEs is low to allow a scheduling for a short period to avoid performance losses.

A summary of the expected relative number of the nCE UEs according to the combinations of the radio channel fluctuation and the fronthaul status is given in Table 1.

TABLE 1

The relative number of the nCE UEs with respect to the CE UEs according to the radio channel fluctuation and the fronthaul status.

| Radio channel | Fronthaul | Relative number of UEs classified as nCE UEs ($N_{ncEuE}$) |
|---|---|---|
| Unstable | High quality | Medium to High (Radio channel stability is still limiting factor) |
| Unstable | Low quality | High |
| Stable | High quality | Low |
| Stable | Low quality | Medium to High (Fronthaul quality is still limiting factor) |

Case 2: The classification of the UEs to the CE and nCE UEs optionally considers an impact on the overall system performance, and the UE is classified as the CE UE and consequently scheduled by the C-Sc if the system performance (e.g., capacity) is improved.

In Case 2, besides the consideration of the radio channel fluctuation and the fronthaul status for the UE classification, an impact on the overall system performance (e.g., on the system capacity) may be considered when the classification of the UEs into the CE and nCE UEs is performed. The classification (and consequent scheduled by the C-Sc or by the D-Sc) is done so that the selected role (either CE or nCE) of the UE improves the overall system performance. For example, the UE may be classified as the CE UE and scheduled by the C-Sc, if the UE's classification to the CE UE improves the overall system performance in terms of the system capacity (e.g., due to the CoMP transmission), QoS, etc. This means that, on one hand, the UE is classified as the CE UE if such classification can increase the system performance even if the fronthaul delay is high (e.g., higher than a predefined threshold), because the gain due to the classification as the CE UE outbids the loss due to a higher delay in the scheduling imposed by the higher fronthaul delay. On the other hand, if the system performance can be improved only slightly when the UE is classified as the CE UE, even a low fronthaul delay may lead to a degradation of the system performance, so it is beneficial to leave the scheduling of the UE to the D-SC in the RRH. Note that the system performance can be considered on the top of the radio channel fluctuation and the fronthaul status, or as a stand-alone metric, or combined with other metrics.

Case 3: The requirements of the UEs connected to a single RRH on the QoS and the available computing power for a processing of the scheduling and related computations in the C-Sc and the D-Scs are optionally considered for the split of functionalities related to the scheduling between the C-Sc and the D-SCs.

In Case 3, the ratio of the CE and nCE UEs may be determined based on the computing complexity of the functionalities carried out in the C-Sc and the D-Sc with respect to an available computing power of the C-Sc and the D-Sc. The complexity may be influenced by the QoS requirements of the UEs, which is required to be scheduled. Thus, the QoS requirements of the UEs needs to be considered as well. Consequently, if the available computing power in the D-Sc is limited (because of the hardware limitations, the high computing load, etc.), the number of the nCE UEs may be decreased so that more UEs are scheduled by the C-Sc.

Another aspect affecting the computing complexity in both the C-Sc and the D-Sc may be the duration of the centralized scheduling period N. The complexity imposed on the C-Sc is decreasing with increasing N since the scheduling by the C-Sc is done less frequently. As a consequence, in order to decrease the computing complexity in the C-Sc, the centralized scheduling period N is extended. Furthermore, increasing the centralized scheduling period N may result in an increment in the complexity of the D-Sc. The reason for this phenomenon is that the D-Sc needs to reschedule the data more frequently for the nCE UEs in later Transmission Time Intervals (TTIs) within NxTTI interval due to a higher probability of a variation of the channel between the nCE UEs and the RRH. Thus, the complexity of the scheduling in the D-Sc may increase for the longer duration of N. In some implementations, the C-Sc may adjust the duration of its centralized scheduling period N to control the computing complexity of the C-Sc or the D-Sc. For example, the C-Sc may increase the duration of the centralized scheduling period N to reduce its computing complexity.

Case 4: The number of the CE and nCE UEs is adjusted to control complexity of the C-Sc and the D-Sc.

In Case 4, since the RRH handles only the scheduling for the nCE UE, the computing complexity of the D-Scs in the RRHs may be decreased by lowering the number of nCE UEs.

Furthermore, the BBU may be involved in all functionalities related to the hierarchical scheduler. For example, the pre-allocation for the HARQ retransmission is done by the C-Sc to manage the potential HARQ retransmissions for the CE UEs (note that the HARQ for the nCE UEs may be handled solely by the RRH in a common way as in existing mobile networks). The computing complexity is proportional to the number of CE UEs for whom the pre-allocation is done. Thus, the computing complexity of the C-Sc may be reduced by lowering the number of CE UEs.

In addition, the optimization of the RLC PDU size is performed according to the inputs from the C-Sc in the BBU. The BBU may either predict a proper RLC PDU size or find a feasible trade-off between the RLC PDU size and the number of the Physical Resource Blocks (PRBs) that cannot be utilized. Since the optimization of the RLC PDU size is done for each nCE UEs, the computing complexity may be proportional to the number of nCE UEs.

Case 5: The classification of the UEs to the CE and nCE UEs for an adjustment of the computing complexity of the C-Sc and the D-Sc may consider an impact on the overall system performance, so some UEs may be classified as the CE and consequently scheduled by the C-Sc if such classification does not impair system performance or the impairment is acceptable with respect to the obtained benefits.

In Case 5, when the UEs are classified according to the computation complexity, the impact of the classification of the UEs to the CE and nCE UEs (e.g., as described in Table 1) on the overall system performance is further considered. Accordingly, the classification (and consequent scheduling by the C-Sc or by the D-Sc) considering the complexity is done so that the selected role of the UE (either CE or nCE) does not impair system performance or the impairment is acceptable with respect to obtained benefits, e.g., in terms of the complexity reduction.

Figure 3:
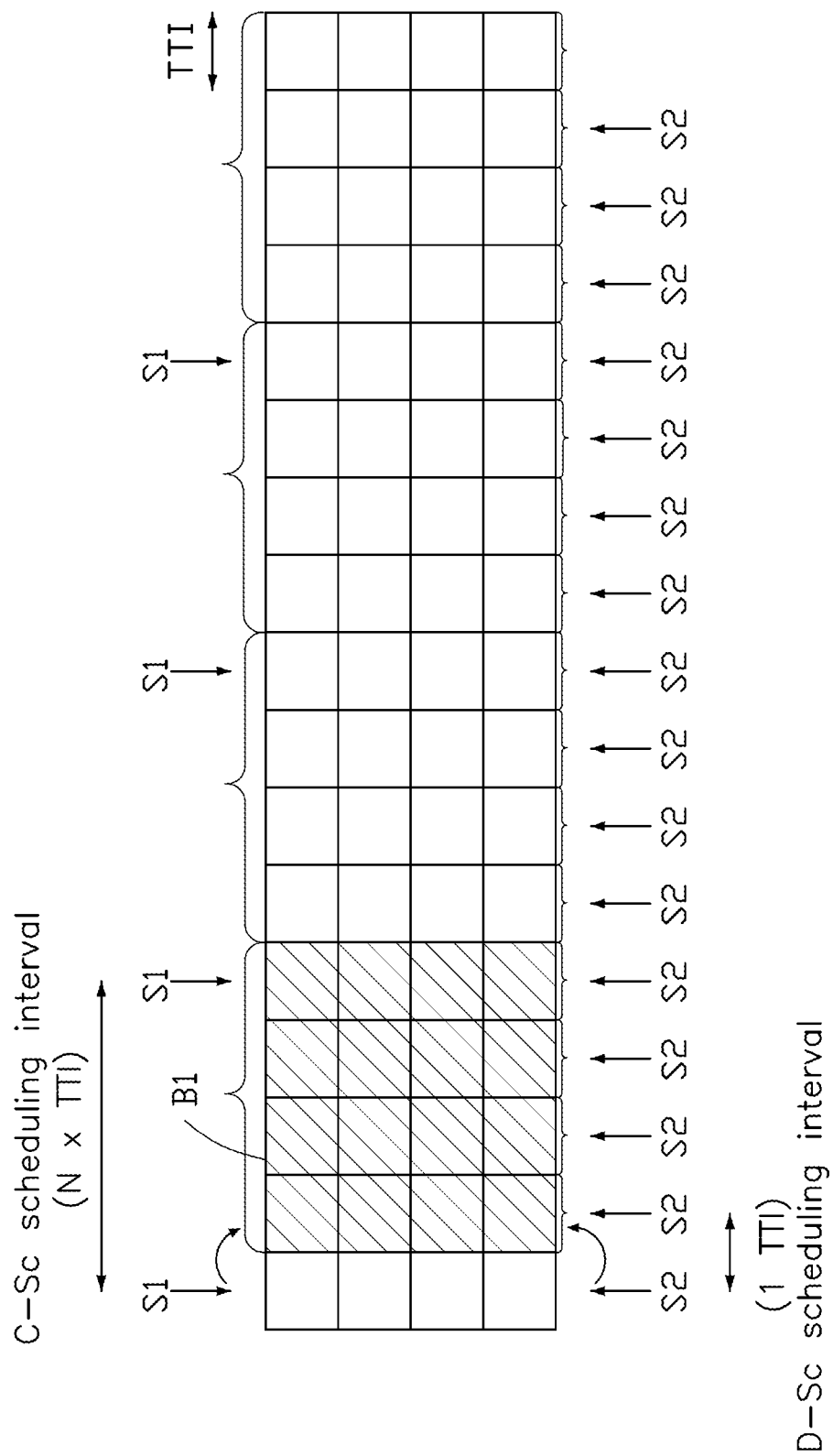
FIG. 3 is a schematic diagram illustrating a hierarchical resource scheduling method, according to an exemplary implementation of the present disclosure.

FIG. 3 is a schematic diagram illustrating a hierarchical resource scheduling method, according to an exemplary implementation of the present disclosure. In the present implementation, each of the UEs is classified by the C-Sc as the CE UE or the nCE UE according to the classification threshold (e.g., $\gamma_t$). For example, if the UE experiences the channel quality (signal level, RSRP, RSRQ, SINR, etc.) below the predefined threshold (e.g., SINR<$\gamma_t$), the UE is considered to be the CE UE. On the contrary, if the channel quality is greater than or equal to the predefined threshold (e.g., SINR≥$\gamma_t$), the UE is considered to be the nCE UE.

The classification threshold (e.g., $\gamma_t$) may be defined to optimize the system performance For example, if $\gamma_t$ is too low, the number of the CE UEs may be small, but some nCE UEs may suffer from strong interferences. On the other hand, if $\gamma_t$ is too high, the number of the CE UEs may be high, and the amount of available Resource Blocks (RBs) may be less because many RBs are consumed at many RRHs for the CE UEs in the CoMP case.

In some implementations, the classification threshold (e.g., $\gamma_t$) may be set with respect to the rules specified in the Cases 1 to 5. In such cases, the C-Sc may determine (or adjust) the classification threshold in response to at least one of 1) the radio channel fluctuation, 2) the fronthaul status of the RRH(s) to which the UE(s) connected, 3) the (overall) system performance, and 4) the computing complexity (or available computing power).

In some implementations, the classification of the UEs to the CE or nCE UEs is performed by the C-Sc dynamically over time. The classification of the UEs may be performed periodically, and the period of the classification may be the same as the scheduling period of the scheduling performed by the C-Sc. For example, the classification of the UEs is performed at every N×TTI (e.g., N Transmission Time Intervals), where N is a positive integer number.

The resource scheduling procedure may be performed in two levels with different periodicity. The scheduling period of the scheduling performed by the C-Sc may be greater than the scheduling period of the scheduling performed by the D-Sc. As shown in FIG. 3, the C-Sc performs a long-term resource scheduling S1 by allocating the RBs B1 for both the CE UEs and the nCE UEs. This can be understood as a scheduling decision not only for one TTI, but for N TTIs (e.g., N×TTI). In some implementations, the scheduling period may be adjusted dynamically over time.

After the long-term scheduling is performed by the C-Sc, the D-Sc may perform a short-term resource scheduling S2 (e.g., at every TTI) for the nCE UEs. In the resource scheduling S2, the resource allocation determined by the C-Sc may be adjusted by the D-Sc so that the changes in channel quality may be reflected and therefore the performance may be improved. In some implementations, the D-Sc may tune the long-term resource scheduling decisions for the nCE UEs tentatively outlined by the C-Sc to improve the system performance Because the nCE UEs may not suffer from the interferences imposed by the neighboring cells (e.g., RRHs), the scheduling decision for the nCE UEs may not have to be coordinated with the neighboring RRHs, and can be up to each individual D-Sc to change the resource allocation according to its preference. For example, the D-Sc may perform the resource scheduling for the nCE UEs independently on other RRHs, and the requirement of each underlying nCE UE may be considered by the D-Sc. As another example, the D-Sc may only adjust the resources scheduled by the C-Sc for the nCE UEs since any change for the CE UEs might lead to an increased interference to the CE UEs. As another example, the D-Sc may exploit the resource blocks which are not dedicated to the CE UEs in an arbitrary way since the interferences from other neighboring cells may be less significant.

Figure 4:
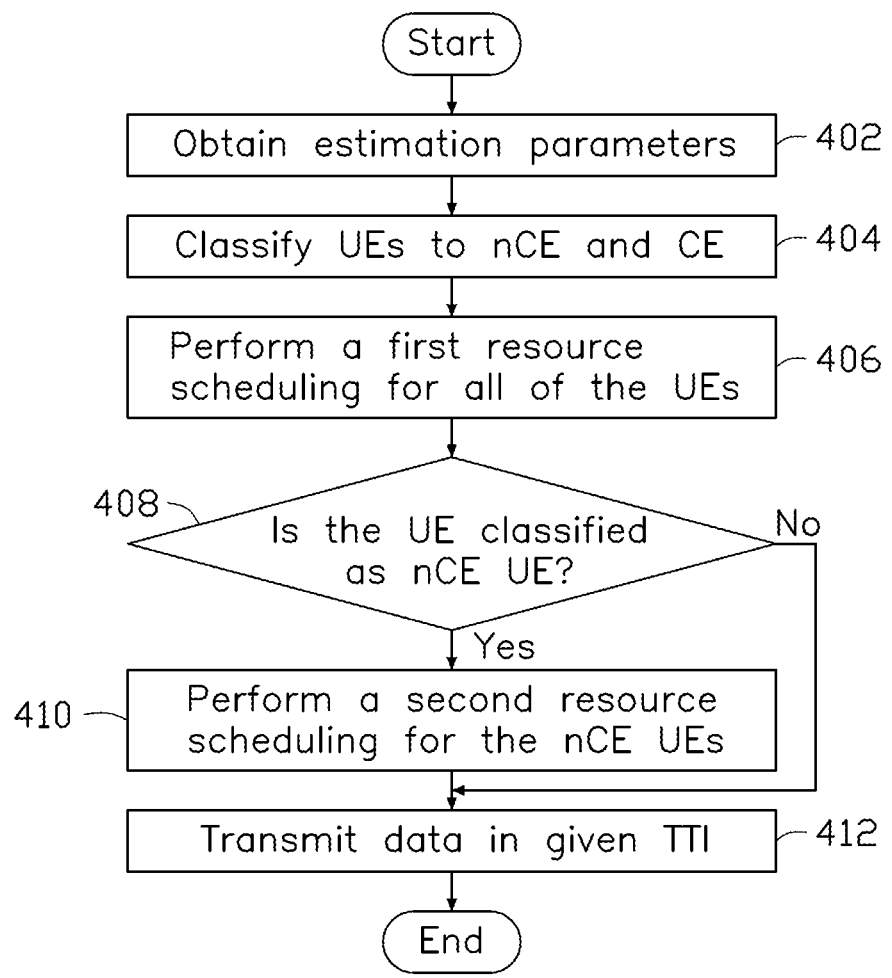
FIG. 4 is a flowchart for a method of resource scheduling in a wireless communication system, in accordance with an exemplary implementation of the present disclosure.

FIG. 4 is a flowchart for a resource scheduling method of a wireless communication system, in accordance with an exemplary implementation of the present disclosure. The flowchart includes actions 402, 404, 406, 408, 410 and 412.

In action 402, the C-Sc obtains estimation parameters related to the wireless communication system. For example, the estimation parameters may include at least one of the radio fluctuation, the fronthaul status, the system performance, and the computing complexity (or the available computing resources) in the D-Sc or the C-Sc.

In action 404, the C-Sc classifies each of the UEs connected to the RRHs managed by the C-Sc as a CE UE or an nCE UE according to the estimation parameters. Thus, after the classification, the sum of the number ($N_{nCEUE}$) of the nCE UEs and the number ($N_{CEUE}$) of the CE UEs is equal to the total number ($N_{UE}$) of the UEs in the network (i.e., $N_{UE}=N_{nCEUE}+N_{CEUE}$).

In action 406, the C-Sc performs a first resource scheduling for all of the UEs connected to the RRHs at, for example, every N1×TTI. In the first resource scheduling, the C-Sc may allocate resources to the CE UEs and the nCE UEs, respectively. The resources allocated to the CE UEs and the nCE UEs are not overlapped at one RRH. In some implementations, the C-Sc may further allocate retransmission resources to the CE UEs and/or the nCE UEs.

In action 408, the D-Sc included in the RRH determines whether a UE is classified as an nCE UE. If the UE is classified as the nCE UE, action 410 is performed. If not, the process continues to action 412.

In action 410, the D-Sc performs a second resource scheduling for the nCE UEs (e.g., at every N2×TTI, wherein N2≤N1). In the second resource scheduling, the D-Sc may (or may not) re-allocate the resources to the nCE UEs so that the resource allocation determined in the first resource scheduling may be adjusted. In some implementations, the D-Sc may further allocate retransmission resources to the nCE UEs.

In action 412, the RRH(s) in the wireless communication system may transmit data to or receive data from the respective CE or nCE UEs on the allocated resources in given TTI(s).

Figure 5:
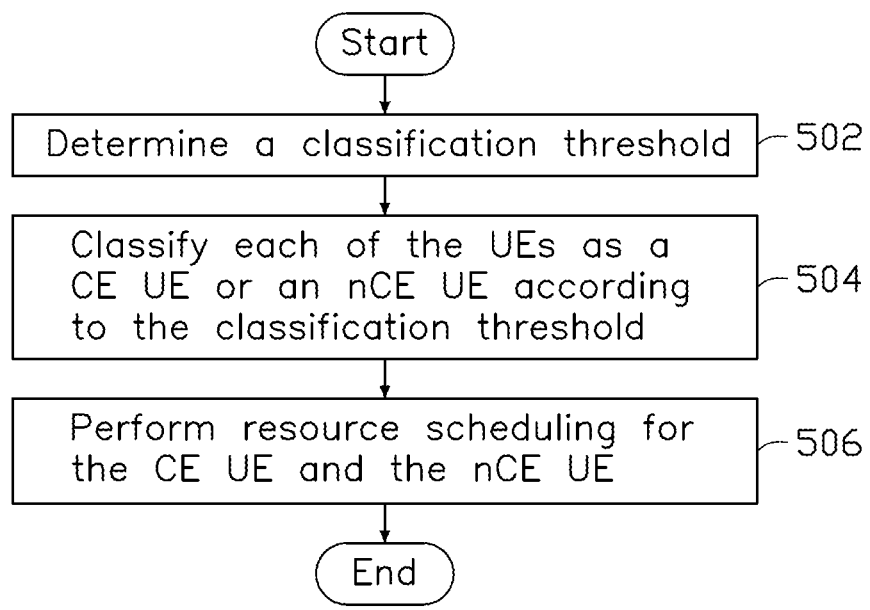
FIG. 5 is a flowchart for a method of resource scheduling in a wireless communication system, in accordance with an exemplary implementation of the present disclosure.

FIG. 5 is a flowchart for a resource scheduling method of a wireless communication system, in accordance with an exemplary implementation of the present disclosure. The wireless communication system includes a BBU, at least one RRH and a plurality of UEs connected to the RRHs. The BBU includes a C-Sc. Each RRH includes a D-Sc managed by the C-Sc. The flowchart includes actions 502, 504 and 506.

In action 502, the C-Sc determines a classification threshold. For example, the C-Sc may determine the classification threshold (represented by, for example, $SINR_T$, $s_{CoMP}$, $\beta$, or any other threshold) in accordance with the estimation parameter(s) described in action 402 of FIG. 4.

In action 504, the C-Sc classifies each of the UEs as a cell edge UE or a non-cell edge UE according to the classification threshold. The classification of the UEs may be various. As described above, in some implementations, the C-Sc may adjust the classification threshold in response to the radio channel fluctuation. For example, the C-Sc may adjust the classification threshold so that a number of the nCE UE increases when the radio channel fluctuation is indicated in the unstable channel state, and decreases when the radio channel fluctuation is indicated in the stable channel state. In another implementation, the C-Sc may adjust the classification threshold in response to the fronthaul status. For example, the C-Sc may adjust the classification threshold so that a number of the nCE UE increases when the fronthaul status is indicated in the low quality state, and decreases when the fronthaul status is indicated in the high quality state. Note that the channel status or fronthaul status as described herein can be distinguished/determined by the C-Sc by checking whether the observed channel information or fronthaul information meets certain condition(s), depending on the system implementation and/or predefined rules.

In yet another implementation, the C-Sc may adjust the classification threshold in response to the system performance For example, the C-Sc may adjust the classification threshold to improve the system performance In yet another implementation, the C-Sc may adjust the classification threshold in response to its available computing power and/or the available computing power of the D-Sc. For example, the C-Sc may adjust the classification threshold to reduce the number of the nCE UEs if the available computing power of the D-Sc is low or insufficient (e.g., lower than a predefined threshold). In yet another implementation, the C-Sc may adjust the classification threshold to control the C-Sc's computing complexity and/or the D-Sc's computing complexity. For example, the C-Sc may adjust the classification threshold to decrease the number of the nCE UEs so that the computing complexity of the D-Sc is reduced.

In action 506, the C-Sc performs a resource scheduling (e.g., the first resource scheduling) for the CE UEs and the nCE UEs. For example, the C-Sc may perform the first resource scheduling to allocate a set of first resources to the CE UEs and a set of second resources to the nCE UEs. In some implementations, the D-Sc may adjust the allocation of the second resources to the nCE UEs after the first resource scheduling is performed.

Figure 6:
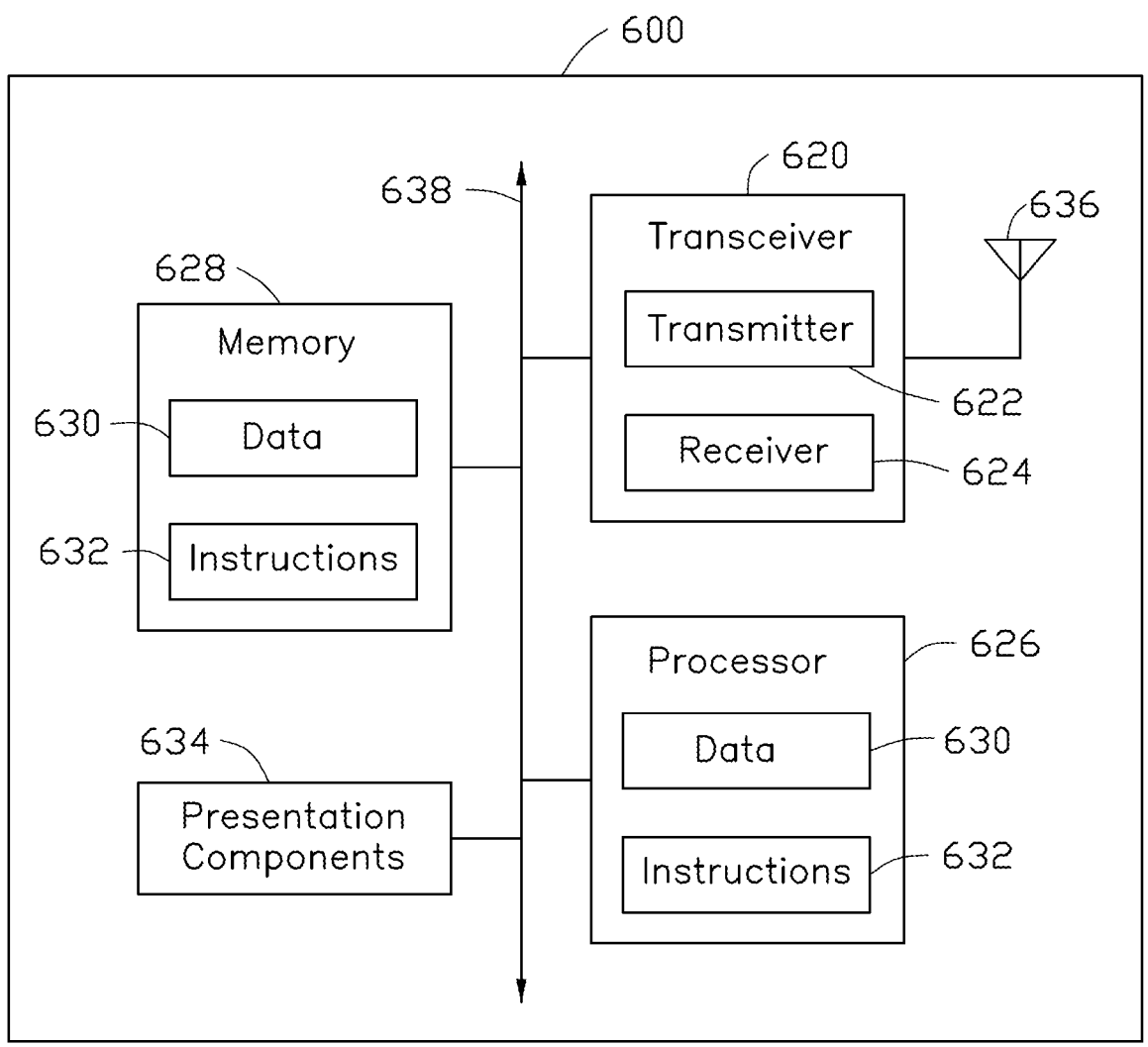
FIG. 6 illustrates a block diagram of a node for wireless communications, in accordance with various aspects of the present application.

FIG. 6 illustrates a block diagram of a node for wireless communication, in accordance with various aspects of the present application. As shown in FIG. 6, a node 600 may include a transceiver 620, a processor 626, a memory 628, one or more presentation components 634, and at least one antenna 636. The node 600 may also include a wireless communication module, a base station communications module, a network communications module, and a system communications management module, Input/Output (I/O) ports, I/O components, and power supply (not explicitly shown in FIG. 6). Each of these components may be in communication with each other, directly or indirectly, over one or more buses 638. In one implementation, the node 600 may be a BBU, an RRH or a UE that performs various functions described herein, for example, with reference to FIGS. 1 through 5.

The transceiver 620 having a transmitter 622 (e.g., transmitting/transmission circuitry) and a receiver 624 (e.g., receiving/reception circuitry) may be configured to transmit and/or receive time and/or frequency resource partitioning information. In some implementations, the transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media can be any available media that can be accessed by the node 600 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 628 may include computer-storage media in the form of volatile and/or non-volatile memory. The memory 628 may be removable, non-removable, or a combination thereof. Exemplary memory includes solid-status memory, hard drives, optical-disc drives, and etc. As illustrated in FIG. 6, the memory 628 may store computer-readable, computer-executable instructions 632 (e.g., software codes) that are configured to, when executed, cause the processor 626 to perform various functions described herein, for example, with reference to FIGS. 1 through 5. Alternatively, the instructions 632 may not be directly executable by the processor 626 but be configured to cause the node 600 (e.g., when compiled and executed) to perform various functions described herein.

The processor 626 (e.g., having processing circuitry) may include an intelligent hardware device, e.g., a central processing unit (CPU), a microcontroller, an Application-Specific Integrated Circuit (ASIC), and etc. The processor 626 may include memory. The processor 626 may process the data 630 and the instructions 632 received from the memory 628, and information through the transceiver 620, the base band communications module, and/or the network communications module. The processor 626 may also process information to be sent to the transceiver 620 for transmission through the antenna 636, to the network communications module for transmission to a core network.

One or more presentation components 634 presents data indications to a person or other device. Exemplary presentation components 634 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A resource scheduling method comprising:
   determining, by a centralized scheduler, a classification threshold;
   classifying, by the centralized scheduler, each of a plurality of User Equipments (UEs) as a Cell Edge (CE) UE or a Non-Cell Edge (nCE) UE according to the classification threshold;
   adjusting, by the centralized scheduler, the classification threshold to control a computing complexity of a computing complexity of a distributed scheduler included in a Remote Radio Head (RRH), wherein the classification threshold is adjusted to decrease a number of the nCE UE so that the computing complexity of the distributed scheduler is reduced; and
   performing, by the centralized scheduler, a resource scheduling for the at least one CE UE and the at least one nCE UE.

2. The resource scheduling method according to claim 1, further comprising:
   adjusting, by the centralized scheduler, the classification threshold in response to a radio channel fluctuation.

3. The resource scheduling method according to claim 2, wherein the classification threshold is adjusted so that a number of the nCE UE increases when the radio channel fluctuation is indicated in an unstable channel state, and decreases when the radio channel fluctuation is indicated in a stable channel state.

4. The resource scheduling method according to claim 1, further comprising:
adjusting, by the centralized scheduler, the classification threshold in response to a fronthaul status.

5. The resource scheduling method according to claim 4, wherein the classification threshold is adjusted so that a number of the nCE UE increases when the fronthaul status is indicated in a low quality state, and decreases when the fronthaul status is indicated in a high quality state.

6. The resource scheduling method according to claim 1, further comprising:
adjusting, by the centralized scheduler, the classification threshold in response to a system performance.

7. The resource scheduling method according to claim 6, wherein the classification threshold is increased or decreased to increase the system performance.

8. The resource scheduling method according to claim 1, further comprising:
adjusting, by the centralized scheduler, the classification threshold in response to an available computing power of the centralized scheduler and/or the distributed scheduler included in the Remote Radio Head (RRH).

9. The resource scheduling method according to claim 8 wherein the classification threshold is adjusted so that a number of the nCE UE is decreased when the available computing power of the distributed scheduler is lower than a threshold.

10. The resource scheduling method according to claim 1, further comprising:
adjusting, by the centralized scheduler, the classification threshold to control a computing complexity of the centralized scheduler.

11. The resource scheduling method according to claim 1, further comprising:
adjusting, by the centralized scheduler, a duration of a centralized scheduling period of the centralized scheduler to control a computing complexity of the centralized scheduler or a computing complexity of the distributed scheduler included in the RRH.

12. The resource scheduling method according to claim 11, further comprising:
increasing, by the centralized scheduler, the duration of the centralized scheduling period to reduce the computing complexity of the centralized scheduler.

13. A Base Band Unit (BBU) comprising:
one or more non-transitory computer-readable media having computer-executable instructions embodied thereon; and
at least one processor coupled to the one or more non-transitory computer-readable media, and configured to execute the computer-executable instructions to:
determine a classification threshold;
classify each of a plurality of User Equipments (UEs) as a Cell Edge (CE) UE or a Non-Cell Edge (nCE) nCE UE according to the classification threshold;
adjust the classification threshold to control a computing complexity of a distributed scheduler included in a Remote Radio Head (RRH), wherein the classification threshold is adjusted to decrease a number of the nCE UE so that the computing complexity of the distributed scheduler is reduced; and
perform a resource scheduling for the at least one CE UE and the at least one nCE UE.

14. The BBU according to claim 13, wherein the at least one processor is further configured to:
adjust the classification threshold in response to a radio channel fluctuation.

15. The BBU according to claim 14, wherein the classification threshold is adjusted so that a number of the nCE UE increases when the radio channel fluctuation is indicated in an unstable channel state, and decreases when the radio channel fluctuation is indicated in a stable channel state.

16. The BBU according to claim 13, wherein the at least one processor is further configured to:
adjust the classification threshold in response to a fronthaul status.

17. The BBU according to claim 16, wherein the classification threshold is adjusted so that a number of the nCE UE increases when the fronthaul status is indicated in a low quality state, and decreases when the fronthaul status is indicated in a high quality state.

18. The BBU according to claim 13, wherein the at least one processor is further configured to:
adjust the classification threshold in response to a system performance.

19. The BBU according to claim 13, wherein the at least one processor is further configured to:
adjust the classification threshold in response to an available computing power of a centralized scheduler and/or an available computing power of the distributed scheduler included in the Remote Radio Head (RRH).

20. The BBU according to claim 19, wherein the classification threshold is adjusted so that a number of the nCE UE is decreased when the available computing power of the distributed scheduler is lower than a threshold.

21. The BBU according to claim 13, wherein the at least one processor is further configured to:
adjust the classification threshold to control a computing complexity of a centralized scheduler.

22. The BBU according to claim 13, wherein the at least one processor is further configured to:
adjust a duration of a centralized scheduling period of a centralized scheduler to control a computing complexity of the centralized scheduler or a computing complexity of the distributed scheduler included in the RRH.

23. The BBU according to claim 22, wherein the at least one processor is further configured to:
increase the duration of the centralized scheduling period to reduce the computing complexity of the centralized scheduler.

* * * * *